United States Patent [19]

Doyle et al.

[11] 4,386,338

[45] May 31, 1983

[54] REMOTE CONTROL SYSTEM

[75] Inventors: Richard C. Doyle, Greenlawn; Lester Rivera, Brooklyn, both of N.Y.

[73] Assignee: Leviton Manufacturing Company, Inc., Little Neck, N.Y.

[21] Appl. No.: 207,534

[22] Filed: Nov. 17, 1980

[51] Int. Cl.$^3$ .............................................. H04Q 5/04

[52] U.S. Cl. .......................... 340/310 A; 340/310 CP

[58] Field of Search ...................... 340/310 A, 310 CP

[56] References Cited

U.S. PATENT DOCUMENTS

| | | | |
|---|---|---|---|
| 3,590,271 | 6/1971 | Peters | 340/310 A |
| 4,024,528 | 5/1977 | Boggs et al. | 340/310 A |
| 4,215,276 | 7/1980 | Janeway | 340/310 A |

*Primary Examiner*—Glen R. Swann, III

*Attorney, Agent, or Firm*—Paul J. Sutton

[57] ABSTRACT

The present invention teaches a remote control system, also capable of designation as a universal switch receptacle system, which is usable in conjunction with remote control devices as well as ground fault circuit interrupting systems. Features include, without limitation, a mounting strap which supports ground terminals while also serving as a magnetic circuitry conduit; a novel flip-flop cam arrangement which enables alternate making and breaking of a circuit; and space-saving means for supporting the cam arrangement about an axis of rotation which coincides with a ground prong insertion axis.

4 Claims, 14 Drawing Figures

FIG. 12
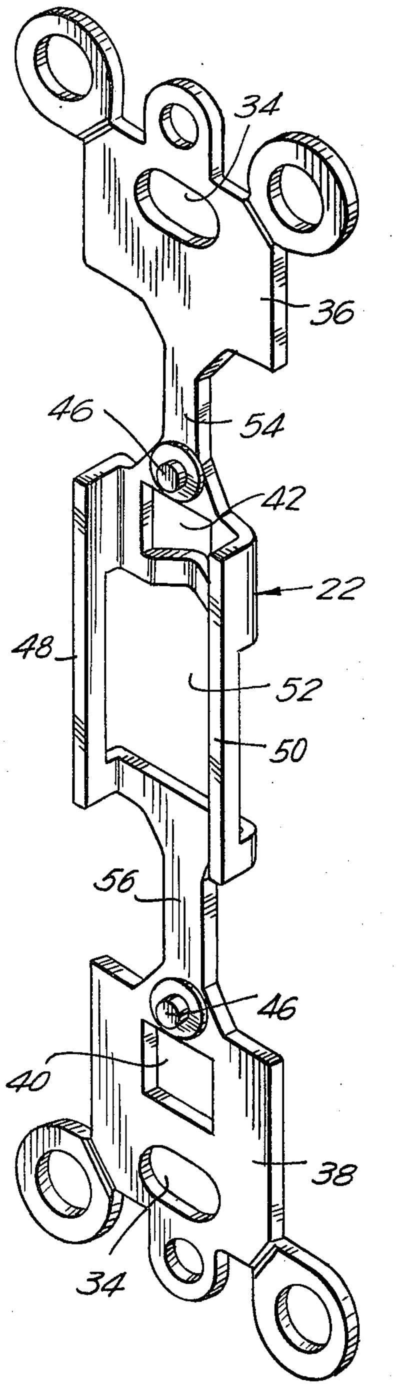
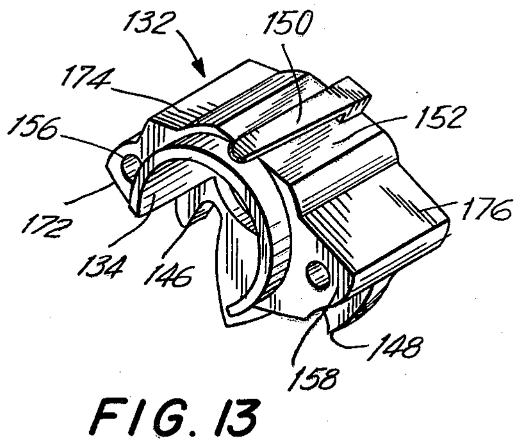
FIG. 13
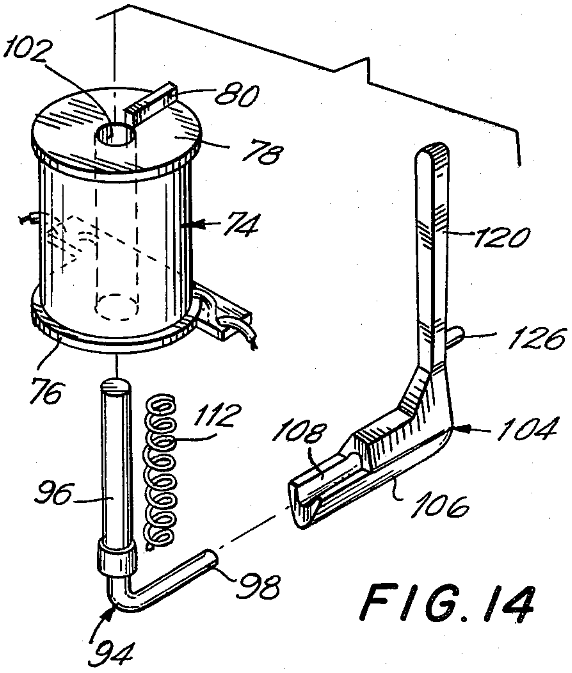
FIG. 14

REMOTE CONTROL SYSTEM

BACKGROUND OF THE INVENTION

The present invention relates to remote control systems and receptacles, and more particularly to a universal switch receptacle system capable of use in conjunction with either remote control systems or ground fault circuit interrupting devices.

FIELD OF THE INVENTION

The use of electronics to control appliances and lighting in the home and within commercial buildings has been made more accessible by systems such as the control system disclosed in U.S. Pat. No. 4,200,862 entitled "Appliance Control", in the names of Campbell and Thompson. Likewise, U.S. Pat. No. 4,189,713 granted on Feb. 19, 1980 in the name of Duffy discloses remote control systems.

However, until now, systems such as described in these patents and which are now commercially available in the United States require the use of "modules" which receive the plugs of cord sets attached to lighting or appliance devices and which, in turn, contain their own electrical connectors whereby they are plugged into normal receptacles of the duplex or other types.

A need exists for a receptacle capable of being used in conjunction with such systems, which can function as an ordinary receptacle if desired, and which is small and shallow enough in structure to enable its being "piggybacked" with one or more of a variety of electronic modules which serve predetermined and desired functions. These functions might include ground fault circuit breaking functions, or any other functions of a control nature that the user feels is important.

SUMMARY OF THE INVENTION

Accordingly, the present invention teaches a remote control system which, throughout this specification, is also referred to as a universal switch receptacle system. In order to fit within the confines of the duplex receptacle box without departing from standard configurations and dimensions, the present invention enables the user to accomplish the foregoing with room to spare for associated electronic and logic circuitry.

Another object of the present invention is to provide a receptacle system which is shallow enough in depth and small enough in size, so as to provide switching and circuit breaking functions of a type compatible with either remote control systems or ground fault circuit breaking signals.

The present invention accomplishes these ends and distinguishes from the known prior art by providing a receptacle having a number of novel and interesting features. These include, without limitation, the provision of a mounting strap which not only serves its traditional mounting function, but additionally serves as a portion of the magnetic circuitry associated with the solenoid-type mechanism; and further serves as the support for integral ground terminals adapted to be engaged by the ground prong of a three-wired plug.

Another feature of the present invention resides in a novel cam arrangement which can only be appreciated from the following more detailed description of the drawings and the components of the present invention disclosed therein, but suffice it to say that not only is a flip-flop cam arrangement taught by the present invention, but its placement about a ground receptacle opening is a unique approach to space saving reliability of functioning.

DESCRIPTION OF PRIOR ART

In the spirit of making known to the U.S. Patent Trademark Office prior art patents other than those already mentioned, but which are really not believed to be relevant as anticipating the present invention, a brief summary of those which are known to the undersigned will be set forth herein.

U.S. Pat. No. 3,569,890 granted on Mar. 9, 1971 discloses a magnetic latching relay arrangement, wherein an annular permanent magnet is utilized.

U.S. Pat. No. 3,584,174, granted on June 8, 1971 discloses a push-button switch arrangement having cam means utilized in conjunction with a light pipe circuit.

U.S. Pat. No. 3,626,337 dated Dec. 7, 1971 discloses an electro-magnetic relay wherein permanent magnet latching is accomplished via a diaphragm as part of the electro-magnetic circuit.

U.S. Pat. No. 3,646,297 granted on Feb. 29, 1972 teaches a push switch arrangement wherein step-by-step advancement of a rotary cam is controlled.

U.S. Pat. No. 3,646,283 granted on Feb. 29, 1972 teaches a multistation switch assembly which controls a number of switch models.

U.S. Pat. No. 3,665,128 granted on Mar. 23, 1972 discloses an electrical switch having a rotary carriage controlable by pushing action.

U.S. Pat. No. 3,666,900 granted on May 30, 1972 discloses a cam structure actuated by a combination of a push-button switch and a joystick.

U.S. Pat. No. 3,676,759 granted on July 11, 1972 teaches a triggered control for photographic apparatus.

U.S. Pat. No. 3,694,603 granted on Sept. 26, 1972 teaches a make and break latching mechanism for remote control of lighting.

U.S. Pat. No. 3,694,779 granted on Sept. 26, 1972 discloses a latching relay assembly wherein a cam roller is utilized.

U.S. Pat. No. 3,717,737 granted on Feb. 22, 1973 teaches an omnidirectional push-button for making and breaking an electrical circuit.

U.S. Pat. No. 3,721,927 granted on Mar. 20, 1973 teaches a bistable electromagnetic relay wherein the state of the relay armatures is altered and controlled.

U.S. Pat. No. 3,727,013 dated Apr. 10, 1973 teaches an interlocked push button switch utilizing actuator indexing means.

U.S. Pat. No. 3,728,651 granted on Apr. 17, 1973 teaches an impulse relay.

U.S. Pat. No. 3,735,068 granted on May 22, 1973 teaches a push button switch.

U.S. Pat. No. 3,740,501 granted on June 19, 1973 discloses a modular contact assembly capable of being stacked to provide programs.

U.S. Pat. No. 3,751,618 granted on Aug. 7, 1973 discloses a push button switch for use with keyboards, wherein a plunger is utilized to enable electrical contact programs.

U.S. Pat. No. 3,805,008 granted on Apr. 16, 1974 discloses a rocker switch actuator wherein highly efficient mechanical force reductions required to actuate the switch are provided.

U.S. Pat. No. 3,827,313 granted on Aug. 6, 1974 discloses a master control switching mechanism.

U.S. Pat. No. 3,852,554 granted in Dec. 3, 1974 discloses a multiposition push button switch cooperative with rotatable gears.

U.S. Pat. No. 3,869,684 granted on Mar. 4, 1975 discloses a latching relay utilizing a magnetic circuitry in conjunction with reed contacts.

U.S. Pat. No. 3,889,088 granted on June 10, 1975 discloses an electrical push button switch actuator.

U.S. Pat. No. 3,896,283 granted on July 22, 1975 teaches a two-stage push button switch and spring arrangement.

U.S. Pat. No. 3,914,723 granted on Oct. 21, 1975 teaches a magnetic latching relay utilizing reversal of current flow.

U.S. Pat. No. 3,932,830 granted on Jan. 13, 1976 teaches a thermal cycle switch for use with domestic cooking ranges.

U.S. Pat. No. 4,090,167 granted on May 16, 1978 teaches a potentiameter and switch assembly utilizing camming surfaces.

These prior art patents, together with all patents cited or referred to therein, are made known by the foregoing recitation. As other relevant prior art becomes know, it will likewise be disclosed to the U.S. Patent and Trademark Office.

BRIEF DESCRIPTION OF THE DRAWINGS

A better appreciation for the subject invention will be realized from a reading of the following specification in conjunction with the drawings, wherein:

FIG. 12 is a perspective-type view of the mounting strap according to the present invention;

FIG. 13 is a perspective-type view of the cam according to the present invention; and FIG. 14 is an exploded-type view of the actuating components utilized in the system according to the present invention.

DESCRIPTION OF A PREFERRED EMBODIMENT

Before referring in more detail to the drawings of the present specification, it is important here to emphasize the universality of the switch receptacle system being described here. By that, what is meant is that the basic switching arrangement described below may be utilized not only in conjunction with remote control wireless switching systems, but also in conjunction with circuit breaking mechanisms and systems, such as of the ground fault circuit interrupting type. Furthermore, in the form to be described below, costs and extraneous features aside, the universal switch receptacle system according to the present invention may be used simply as an ordinary household receptacle under circumstances making this desirable.

Figure 1:
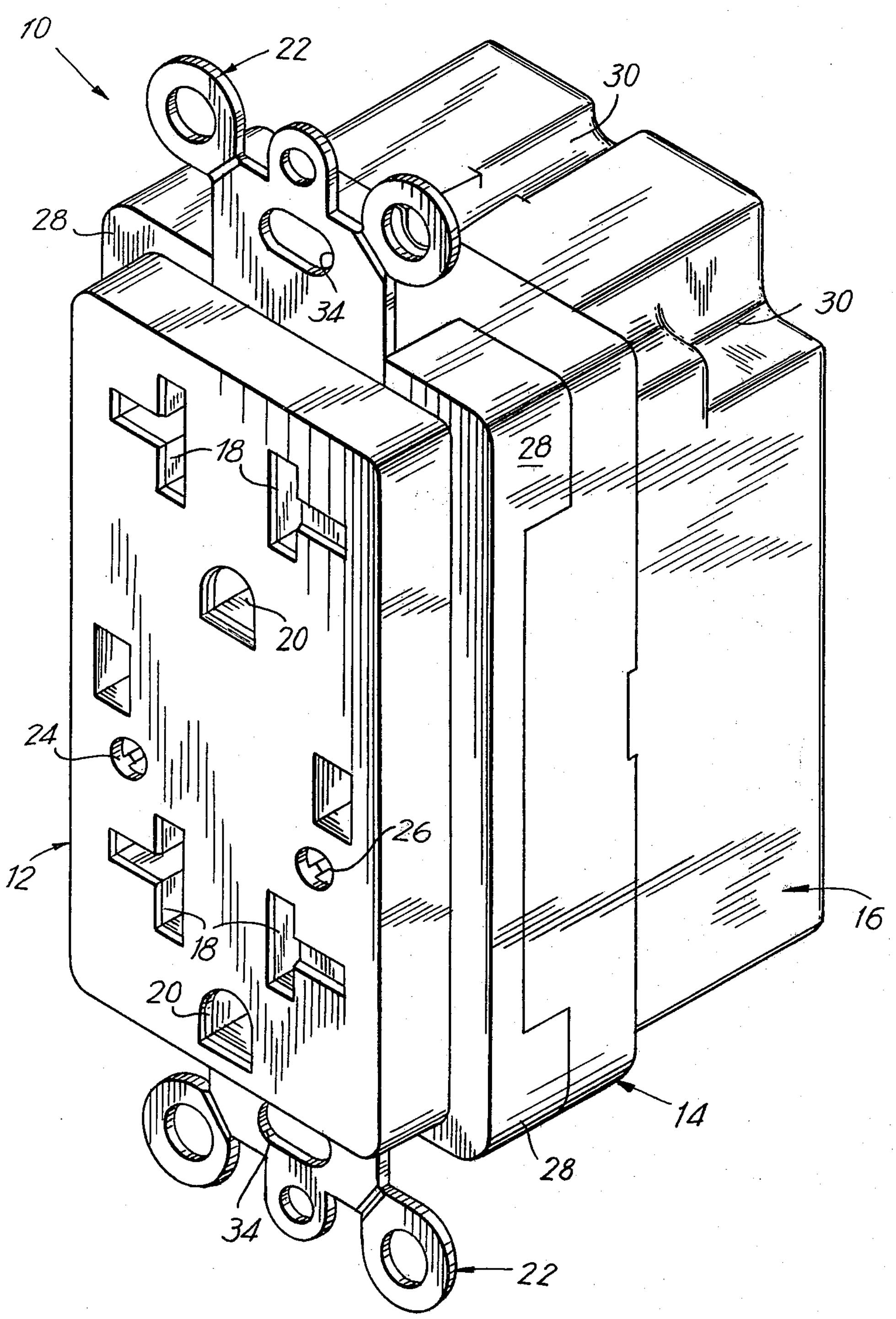
FIG. 1 is a perspective view of the remote control system or receptacle switch system according to the present invention.

Referring now in detail to the drawings, reference character 10 shall be used throughout this specification to describe the overall universal switch receptable system of the present invention. FIG. 1, depicting a perspective view of the present invention, illustrates a preferred embodiment of our invention wherein three distinct housing portions 12, 14 and 16, respectively, when assembled, make up the overall system 10 housing.

Installed, the face or cover housing portion 12 will be visible, and includes entry ports 18 for receiving normal or polarized prongs of a male plug normally found at the end of a lamp or appliance cord set (not shown), as well as an opening 20 for receiving the ground prong of a three-wired plug. As shown in FIG. 1, a duplex-type receptacle is shown wherein a second pair of receptacle ports 18 and a second ground-receiving opening 20 are provided.

A unique mounting strap or yoke 22 is shown in FIG. 1 sandwiched between face or cover housing portion 12 and its adjoining housing portion 14. While strap or yoke 22 includes external features similar in appearance to conventional mounting straps or yokes normally used in the trade today, a further reading of the specification will enlighten the reader as to its unique configuration and functioning according to the present invention.

Face portion 12 is further formed with a pair of through openings 24 and 26, which accommodate channel selecting controls that will be described further within this specification. Suffice it to say that the provisions of openings 24 and 26 in the face of portion 12 enables the user of the universal switch receptacle system 10 to gain access to and manipulate the controls being referred to.

Four housing shoulders 28 of face portion 12 nest with and engage housing portion 14 during assembly of the system 10. The shape of shoulders 28 and their cooperative alignment with corresponding surfaces of housing portion 14 assure proper alignment of the entire assembly and the sub-assemblies and components contained therein. Provision is made for conventional-type fasteners, such as screws (not shown), which are used to join housing portions 12 and 14 together, as well as portions 14 and 16 together.

At the risk of stressing the universality of system 10, the present invention contemplates housing portion 16 enclosing the electronics circuitry adapting the switch receptacle of this system to the particular purpose and function desired. For example, in the embodiment of the invention that will be described in this specification, electronic components compatible with a remote control system described in U.S. Pat. Nos. 4,200,862 granted on Apr. 29, 1980 and 4,189,713 granted on Feb. 19, 1980 are housed and mounted within the enclosure defined by the inner surfaces of housing portion 14 and the inner confine surfaces of housing portion 16.

Housing portions 12, 14 and 16 are preferably injection molded of a plastic material having characteristics of durability and reliability. The outer configurations of these housing portions are such as to provide reliefs or accessways 30 for facilitating the use of tools to install and assemble the components of this system.

Figure 2:
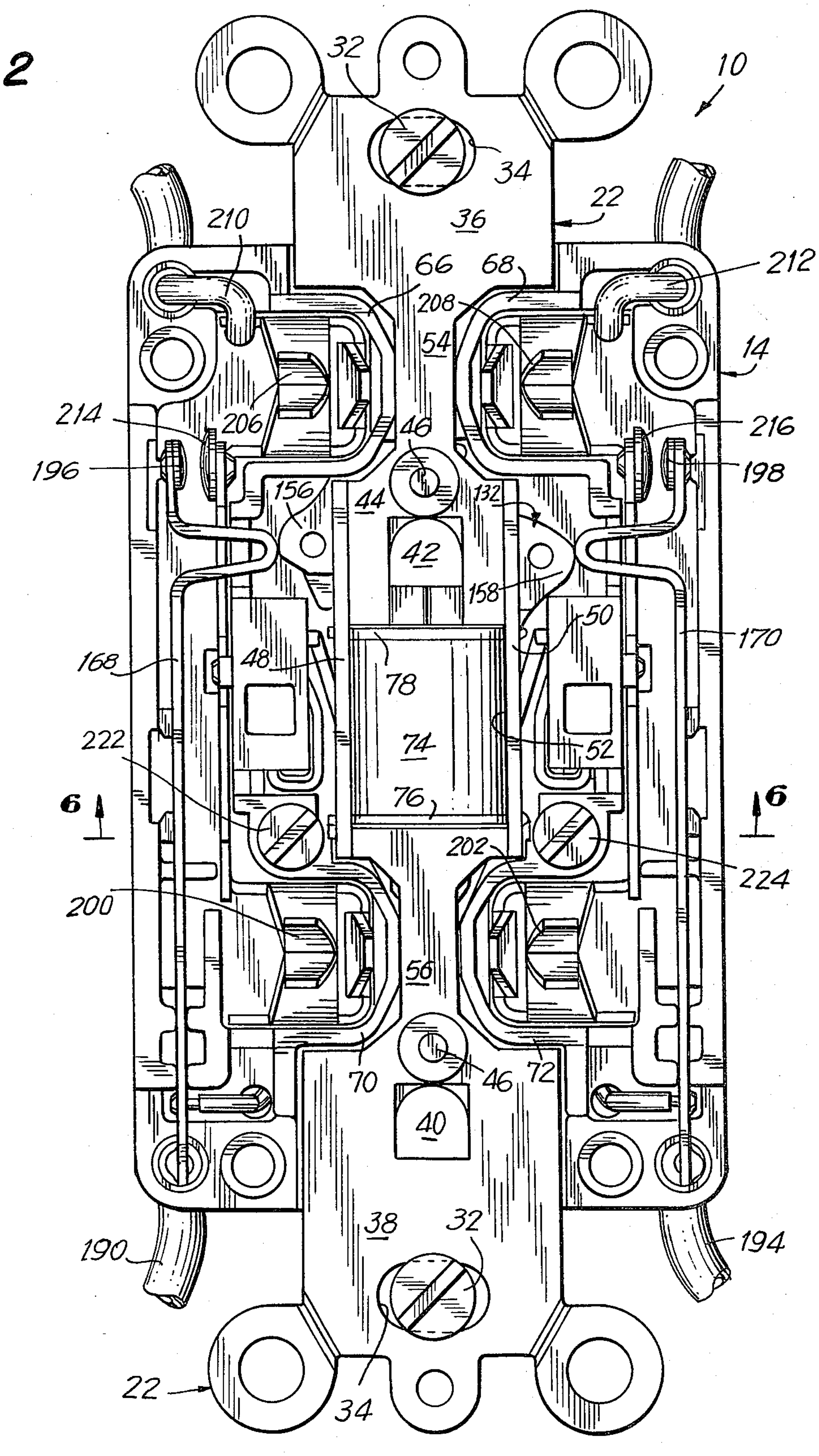
FIG. 2 is a top plan view of the system of FIG. 1, with the cover housing portion removed showing the mounting strap therewithin.

FIG. 2 may best be described as being a view of the system 10 from the front after removing the face or cover housing portion 12 from the rest of the assembly. While this view does not reveal some of the more critical components and features of this invention, it does serve to illustrate the position of the mounting strap 22 with respect to its neighboring components. Mounting screws 32 are shown extending through mounting slots 34 of strap 22 to orient the reader insofar as the mounting of the entire assembly 10 within a duplex receptacle box is concerned.

Strap 22 is formed with a pair of end tab portions 36 and 38, the latter unlike the former including a generally square opening 40 formed therethrough. A second opening 42 is formed through relatively central body portion 44 of strap 22, each of openings 40 and 42 being defined by surfaces of strap 22 which are adjacent rivet posts 46 integrally formed with the strap. The reader is referred to FIG. 12 which, in a perspective-type view, more clearly illustrates the strap 22 configuration.

Strap 22 is created from blanked steel sheet metal by means of a progressive die stamping and forming procedure, and further includes a pair of relatively upstanding boundary ribs 48 and 50 located on opposite sides of a coil opening 52 formed therethrough.

When assembled and positioned with respect to housing portion 14 and its cover portion 12, neck portions 54 and 56 of strap 22 fit snugly between opposing surfaces 58 and 60 on one hand and 62 and 64 on the other (see FIG. 3), of generally U-shaped walls 66 and 68 on one hand and 70 and 72 on the other, respectively. These U-shaped walls are more easily seen within the larger view of FIG. 3, which depicts the universal switch receptacle system with the strap 22 just described removed from the said assembly. At this point it is worth mentioning that rivet posts 46 formed in strap 22 are provided to receive and secure ground contacts (not shown) which electrically communicate with the strap 22 and are held integrated with it when placed. A grounding connection is assured by means of mounting screws 32 which secures strap 22 to a supporting structure which is grounded, and the integral ground contacts located within openings 40 and 42 form a grounding communication between the ground male terminal of a three-wired plug to the grounded strap 22.

Figure 3:
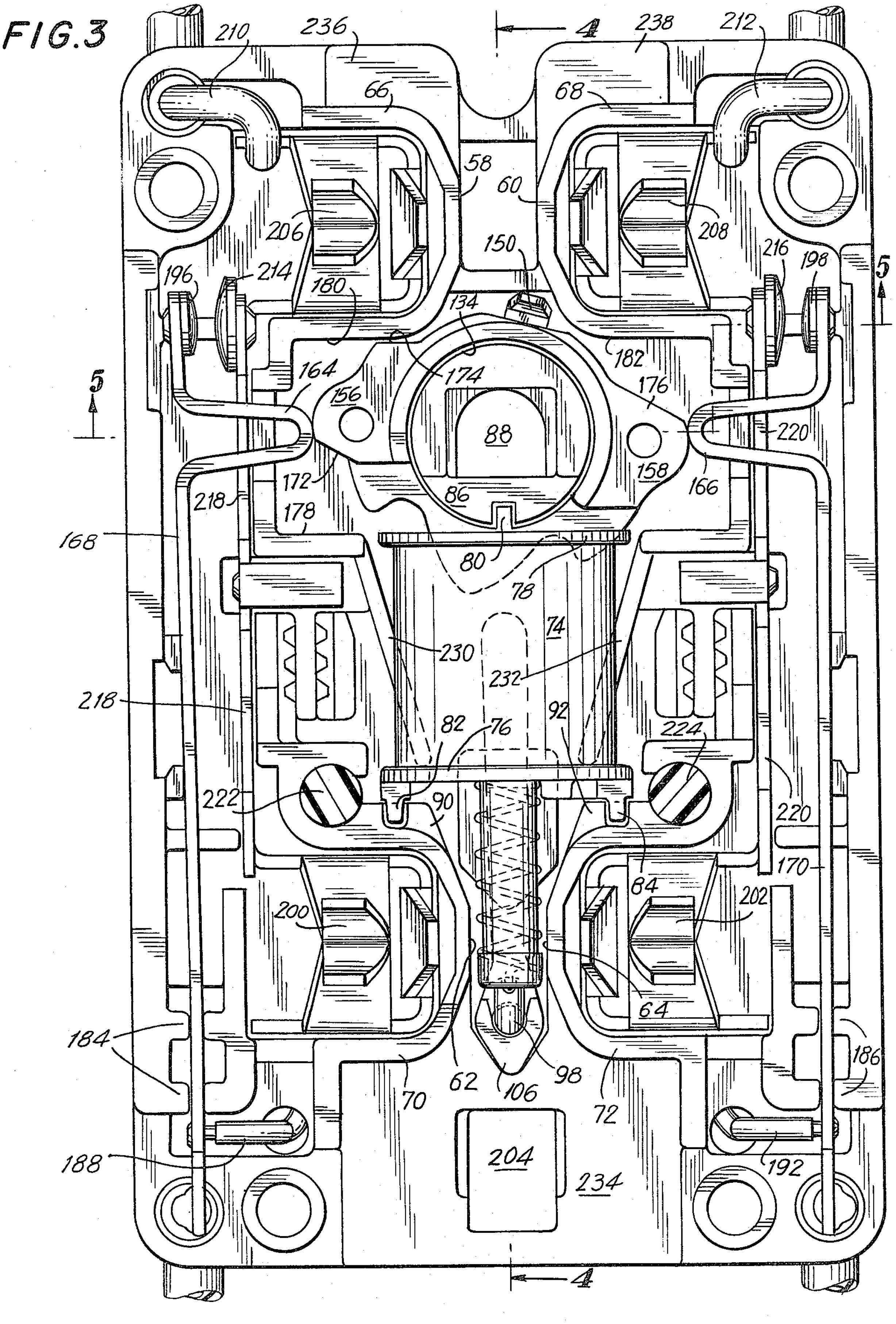
FIG. 3 is an enlarged fragmentary plan view of the system shown in FIGS. 1 and 2, wherein the mounting strap has been removed to show components lying beneath it.

The generally U-shaped cutouts of the material forming strap 22 at either end, so as to define neck portions 54 and 56, cooperate with the U-shaped walls 66, 68, 70 and 72, thereby restricting the movement of strap 22 within the assembly. A coil or stator 74 is mounted centrally within housing portion 14, and is located with respect to strap 22 such that the coil or stator 74 and its windings are disposed within the opening 52 bounded on either side by ribs 48 and 50 of the strap. Coil 74 includes a predetermined number of wire windings held upon a spool formed with end flanges 76 and 78, the latter flange being formed with an integral locating rib 80 extending upwardly as depicted in FIG. 3. End flange 76, on the other hand, is formed with a pair of integral and spaced locating tabs 82 and 84 which extend outwardly from the coil in the direction opposite from that of rib 80.

Rib 80 is held within a recess defined by a hollow generally cylindrical post 86, through which an opening 88 communicative with opening 20 in housing portion 12 extends. At this point for the sake of clarity it should be stated that opening 88 accommodates the entry of a grounding prong of a three-wired plug of the type already described in conjunction with housing portion 12 and opening 42 within strap 22. Opening 42 overlies and is in substantial alignment with opening 88.

Locating tabs 82 and 84 normally are situated within recesses formed within bosses 90 and 92 which are integrally formed with U-shaped walls 70 and 72 at their upper ends. This three point anchoring and locating of outer portions of coil 74 provide relatively accurate alignment of the coil with respect to the rest of the components to be described herein. It further assures proper registration with the opening 52 in strap 22 as well as the location of coil 74 with respect to upstanding ribs 48 and 50 of the strap.

Coil 74 functions in a manner similar to that of a solenoid stator or coil, and has associated with it a plunger 94 (FIG. 4) supported for reciprocating movement within a central opening of coil 74. Plunger 94, shown more clearly in FIG. 4, includes a generally cylindrical body 96 from which a hook portion 98 extends outwardly and then at approximately 90 degrees from the body 96. The spool 100 whose end flanges 76 and 78 have already been described, includes a generally central opening 102 within which body portion 96 of plunger 94 is able to extend and reciprocate, as will be described in more detail below.

An actuating member 104, sometimes more affectionately known as a "kicker", is located beneath coil 74 and its associated plunger 94. Actuating member 104 includes a leg 106 formed with a recess 108 into which hook portion 98 of plunger 94 normally extends and is held. Yet another recess to which a reference character has not been assigned captively holds an end 110 of a helical spring 112 whose opposite end 114 overlies a locating protuberance 116 extending integrally from flange 76 of spool 100. Helical spring 112 functions in compression and, as shown in FIG. 4, normally biases a leg 106 of actuating member 104 away from coil 74 toward housing wall 118, which serves as a limiting surface.

Actuating member of kicker 104 further includes a vertically extending leg 120 which extends at approximately 90 degrees from leg 106, and which rides upon a generally planar surface 122 of housing 14. Surface 122 is interrupted by a recess 124 into which an alignment boss 126 extends. Alignment boss 126 and the surfaces of the housing 14 which define recess 124 serve a realignment function during reciprocation of actuating member 104, as will be more clearly understood from a reading of the following portions of this specification.

Figure 4:
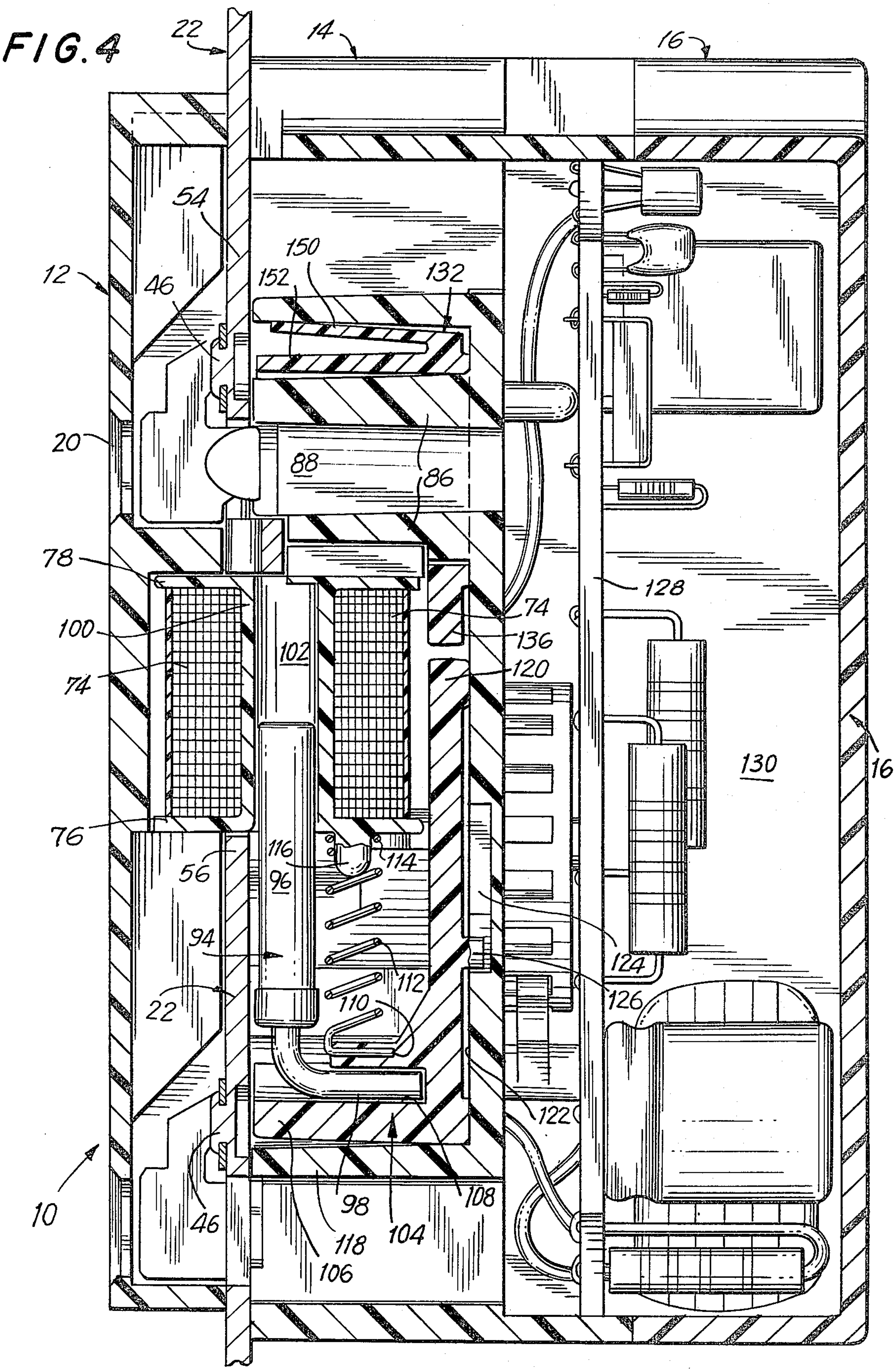
FIG. 4 is a fragmentary sectional elevational view taken along the line 4—4 of FIG. 3.
Figure 5:
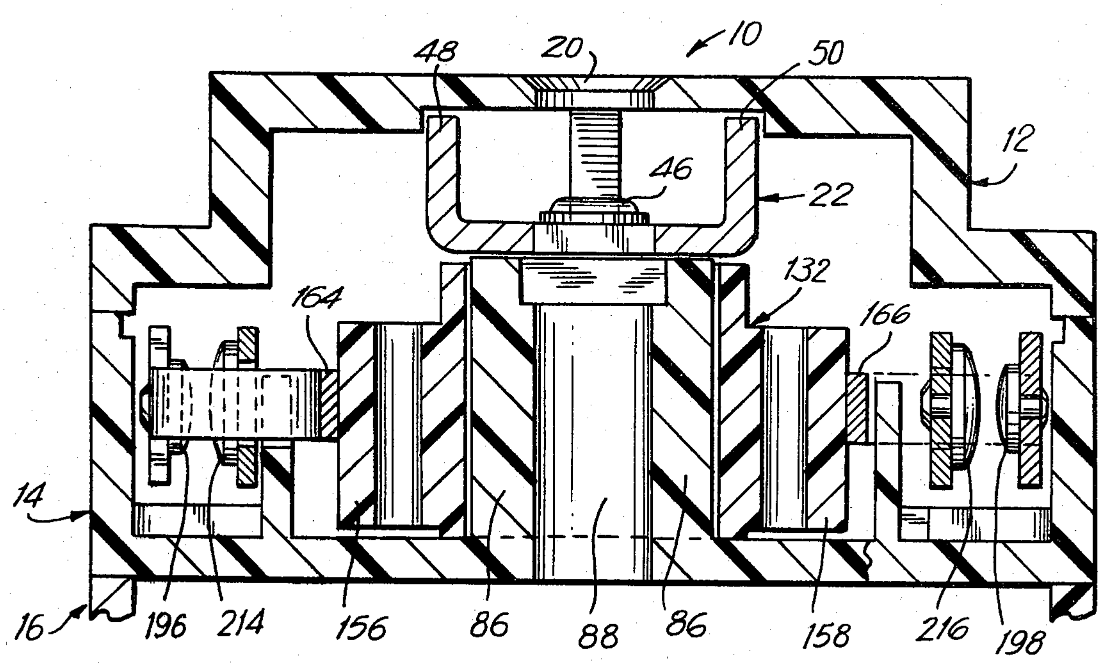
FIG. 5 is a fragmentary sectional elevational view taken along the line 5—5 of FIG. 3.
Figure 6:
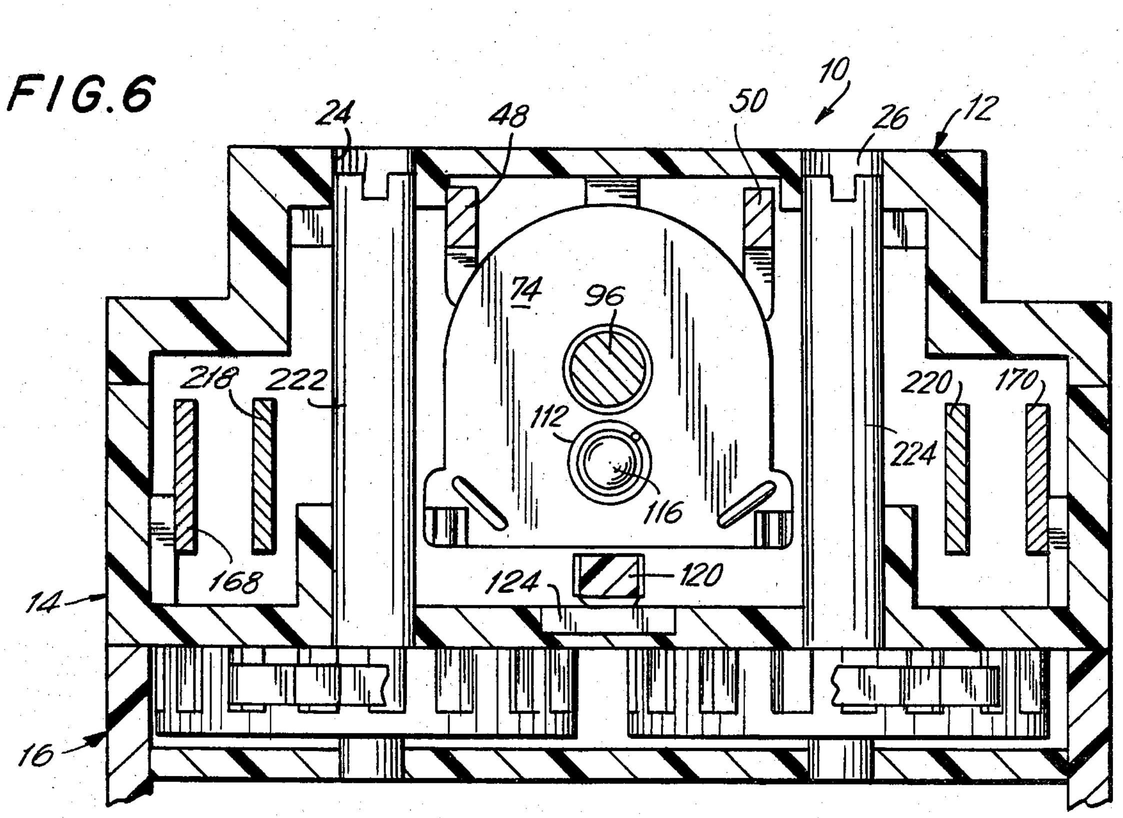
FIG. 6 is a fragmentary sectional elevational view taken along the line 6—6 of FIG. 2.

Viewed in FIG. 4, it should now be obvious to the reader that reciprocation of plunger 94 as a result of alternate energization and deenergization of coil 74 will result in like reciprocation of actuating member 104, first toward coil 74 when the coil is actuated, and thereafter away from coil 74 under the biasing forces of spring 112 when the coil is deenergized.

While we are looking at FIG. 4, the reader will note that an assembly of electronic components are shown supported by housing portion wall 128 and extending into a chamber designated reference character 130, which, in turn, is defined by wall 128 and housing portion 16. No effort will be made within the present specification to either define in detail or by function the various electronic components shown existing within chamber 130. However, the present invention contemplates an ability to "piggy-back" upon the switch mechanism distinct electronic assemblies having distinct functions, such that their functions can be adapted to and include the features of the switching and circuit breaking characteristics of the universal switch receptacle system 10 being described within this specification.

Before going on to a description of other components of the present invention and system, it is very strongly emphasized here that a novel feature of the present invention includes the use of and provision of the strap and its upstanding ribs 48 and 50 to serve as means by which the magnetic circuit associated with coil 74 and plunger 94 flows and is conducted. In other words, portions of strap 22 in the form of its configuration and disposition with respect to the coil 74 serve as a path and an inducement of the magnetic circuit which enables coil 74 and its plunger 94 to act in a solenoid-like fashion. Strap 22 serves the function of a coil frame and actually includes part of the magnetic circuit upon the firing of coil 74. This is the same mounting strap 22 which also supported riveted integral ground terminals.

Figure 7:
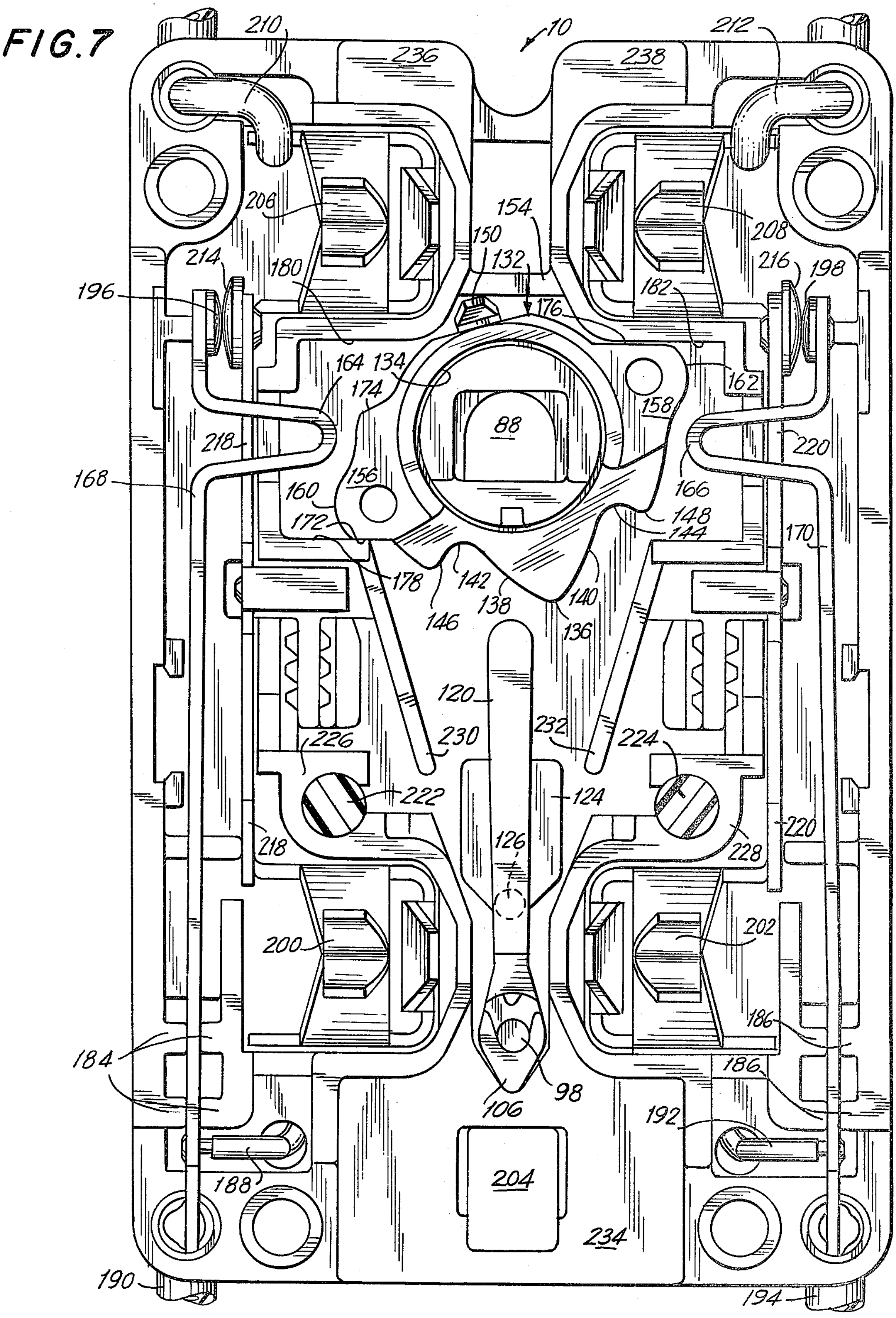
FIG. 7 is an enlarged plan view of the system of FIG. 1, showing components of the invention after strap and solenoid components have been removed.

The reader's attention is now turned to a novel cam arrangement which serves as a flip-flop reciprocating rotor. A cam 132 shown in perspective in FIG. 13, is also shown in plan views within FIGS. 7, 8, 9, 10 and 11. Cam 132, as viewed in FIG. 7, is preferably a single, unitary member which is formed by injection molding and which includes a generally central cylindrical bore or opening 134 whose diameter is very slightly larger than the outer diameter of post 86. Cam 132 is actually mounted over and encircles post 86 when assembled such that the surfaces defining bore 134 slidably engage the outer surfaces of post 86 with sufficient clearance to avoid undesirable wear. At what is arbitrarily be called a forward end 136, a pair of ramp surfaces 138 and 140 converge, these ramp surfaces extending away from forward end 136 to pockets 142 and 144 defined by curvilinear surfaces which likewise define opposite shoulders 146 and 148, respectively.

Cam 132, at a side or end opposite that of end 136 is formed with an upstanding spring tab 150 which is placed a predetermined distance from an upstanding hub 152 encircling post 86 (see FIG. 4). Interference between the outer surfaces of spring tab 150 and inner surfaces of housing portion wall 154 result in most stable orientations of cam 142 in the position shown in FIG. 7, on one hand, and in FIG. 10 on the other, wherein spring tab 150 lies within clearance defined by the housing configuration and its relationship to cam 132. At this point it should be emphasized that cam 132 is free to rotate between positions shown in FIGS. 7 and 10, for example, as will become more readily apparent below.

Cam 132 is further formed with a pair of oppositely extending wing members 156 and 158 whose outer cam surfaces 160 and 162 are adapted to bear against and move surfaces 164 and 166, respectively, of leaf spring contact supporting members 168 and 170.

Rotary movement of cam 132 is limited by interference between stop surfaces and 172, 174 and 176, with upstanding housing wall surfaces 178, 180 and 182, respectively. Thus, as shown in FIG. 7, counter clockwise rotation of cam 132 about post 86 is limited by interference between surfaces 172 and 178 as well as between surfaces 176 and 182. In the case of clockwise rotation of cam 132, this directional movement is limited, as can best be seen in FIG. 10, by interference between surfaces 174 and 180.

Referring now in a bit more detail to the leaf spring contact supporting members 168 and 170, FIG. 7 illustrates their being anchored between respective opposing pairs of wall fingers 184 and 186, between which these members are force-fit and held. Electrical connections are accomplished via conductors 188, 190, 192 and 194. Conductor 190 carries an electrical connection to member 168 and, thus, the movable contact 196 which it suppots. Likewise, conductor 194 carries an electrical connection to member 170 and, in turn, the movable contact 198 which it supports. Contacts in all cases as concerns the present invention are of the silver type, and in the case of movable contacts 196 and 198 are riveted or otherwise fastened to the ends of support members 168 and 170. Conductor 188 electrically interconnects contact 196 and its support member 168 with electronic components beneath blade-receiving terminal 200. Likewise, conductor 192 electrically interconnects contact 198 and its support member 170 with electronic components beneath blade-receiving terminal 202.

Terminals 200 and 202, together with optional but provided opening 204 accept the blades and grounding prong, respectively, of a male plug which is plugged into the system 10. Blade-receiving terminals 206 and 208 are, respectively, electrically joined by conductors, such that a second of the duplex receptacles will accommodate entry of the blades of a plug into engagement with terminals 206 and 208, with a grounding prong being accepted within opening 88.

In a preferred embodiment of the present invention, fixed contacts 214 and 216 are mounted upon conducting strips 218 and 220, respectively, such that electrical continuity is provided as between terminal 206, fixed contact 214, and terminal 200.

Still referring to FIG. 7, it can be seen that electronic channel selector shafts 222 and 224 extend upwardly through cylindrical openings defined by housing walls 226 and 228, respectively, these shafts extending from connections to the electronic components beneath this mechanical assembly outwardly to the openings 24 and 26 already described for the face housing portion 12. In this way, the user is able to manipulate these shafts 222 and 224, such as by means of a screwdriver, and appropriate channel selection is easily accomplished.

Also visible in FIG. 7 are guide walls 230 and 232, which limit the left-to-right movement of kicker leg 120. Other walls serve a variety of functions which include spacing, holding, and movement limiting functions with respect to the various components of system 10 being described here. Pads 234, 236 and 238 serve as support surfaces for the end tab portions 36 and 38 of mounting strap 22.

In operation, assuming a normal condition wherein fixed contacts 214 and 216 are engaged by their movable respective counterparts, 196 and 198, thereby providing current flow to a lamp or appliance, for example, actuation of coil 74 in response to a signal generated by the electronic components heretofore described, will result in retraction of the body portion 96 of plunger 94 toward the center of opening 102 within coil 74. This retraction occurs against the biasing forces of helical spring 112 with the resulting movement of actuating member 104 and its kicker leg 120 in the same direction as plunger 94 due to the engagement of hook 98 within recess 108 of leg 106.

Figure 8:
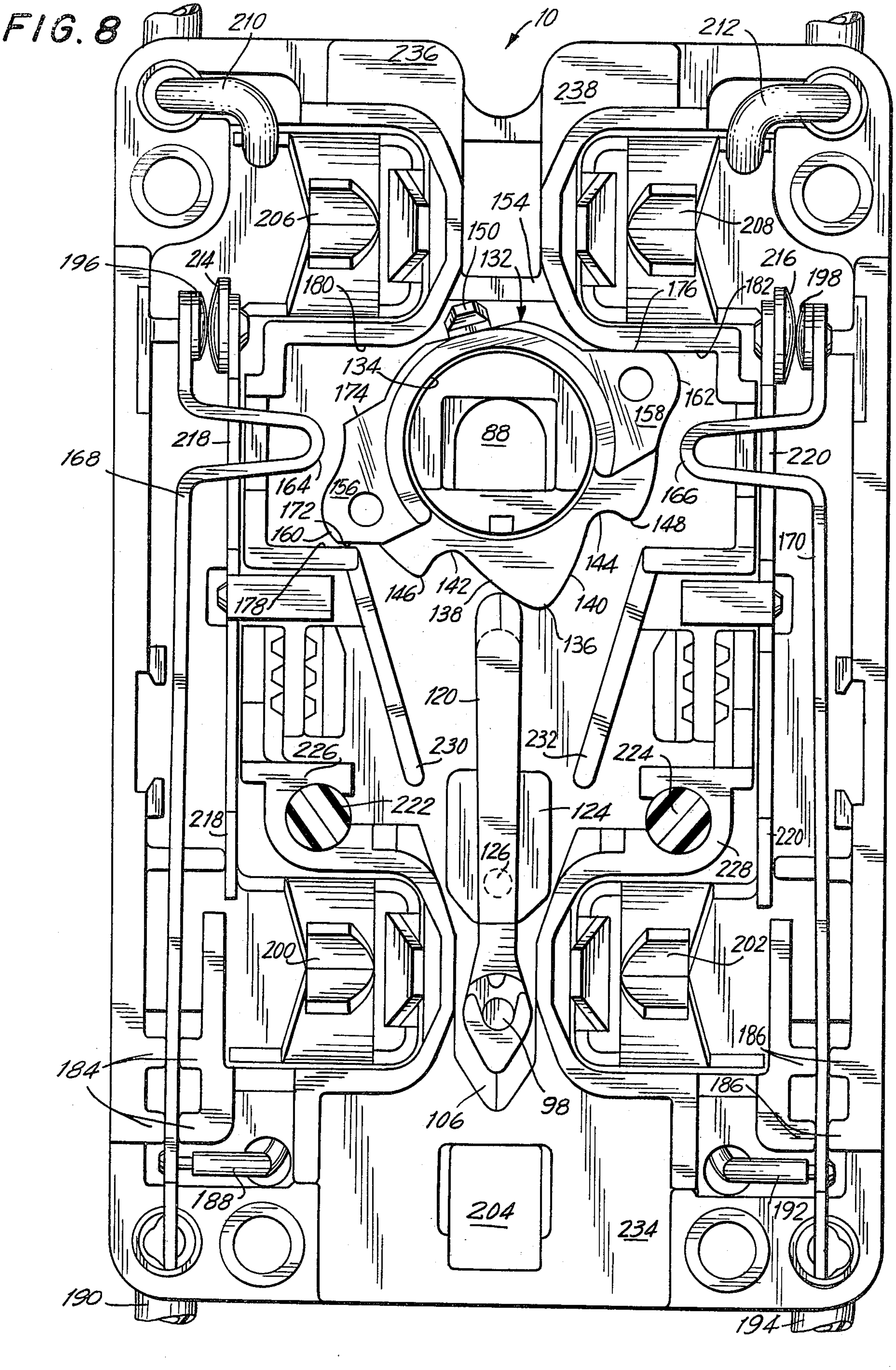
FIG. 8 is a view similar to FIG. 7 showing a next sequential step after coil actuation.
Figure 9:
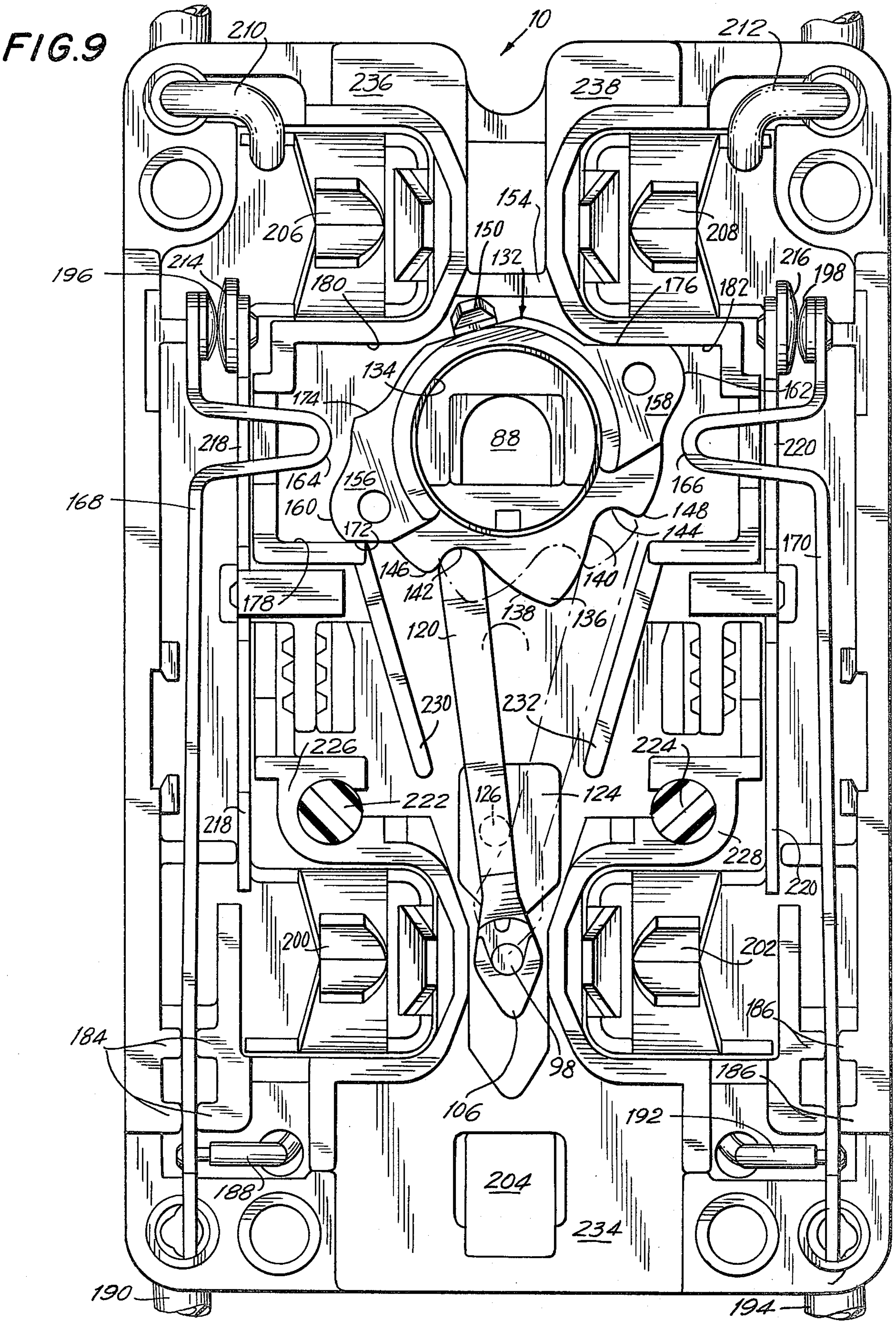
FIG. 9 is a view similar to FIG. 8 showing a next sequential step after coil actuation.

Referring to FIG. 8, this movement of kicker leg 120 is shown from the position depicted in phantom outline in FIG. 8 toward the position shown in solid in FIG. 8 wherein leg 120 engages ramp surface 138 of cam 132. Yet further movement of kicker leg 120 as a result of the pulling magnetic forces generated by coil 74 result in sliding movement of the end of leg 120 upwardly along ramp surface 138 until the end of leg 120 engages pocket 142 and adjoining shoulder 146. This next intermediary position is best seen in FIG. 9, wherein the position just described is shown in full line depiction. Yet further movement of kicker leg 120 under the influence of hook 98 results in clockwise rotation of cam member 120 about post 86 due to the pushing of the end of kicker leg 120 against shoulder 146 until surfaces 174 and 180 interfere with one another and the cam 132 comes to rest in the position shown in FIG. 10.

Figure 10:
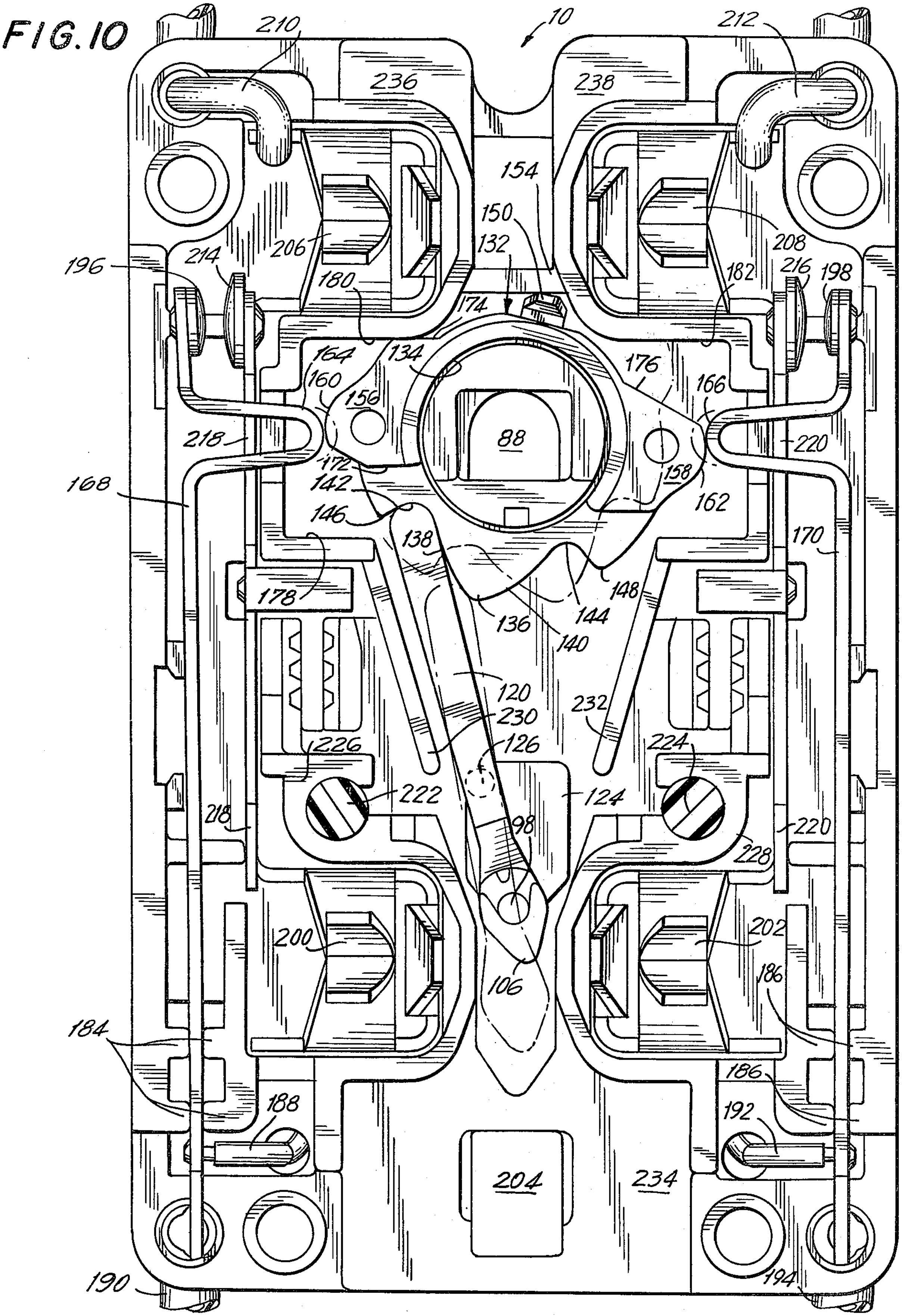
FIG. 10 is a view similar to FIG. 9, showing the next sequential step after coil actuation.
Figure 11:
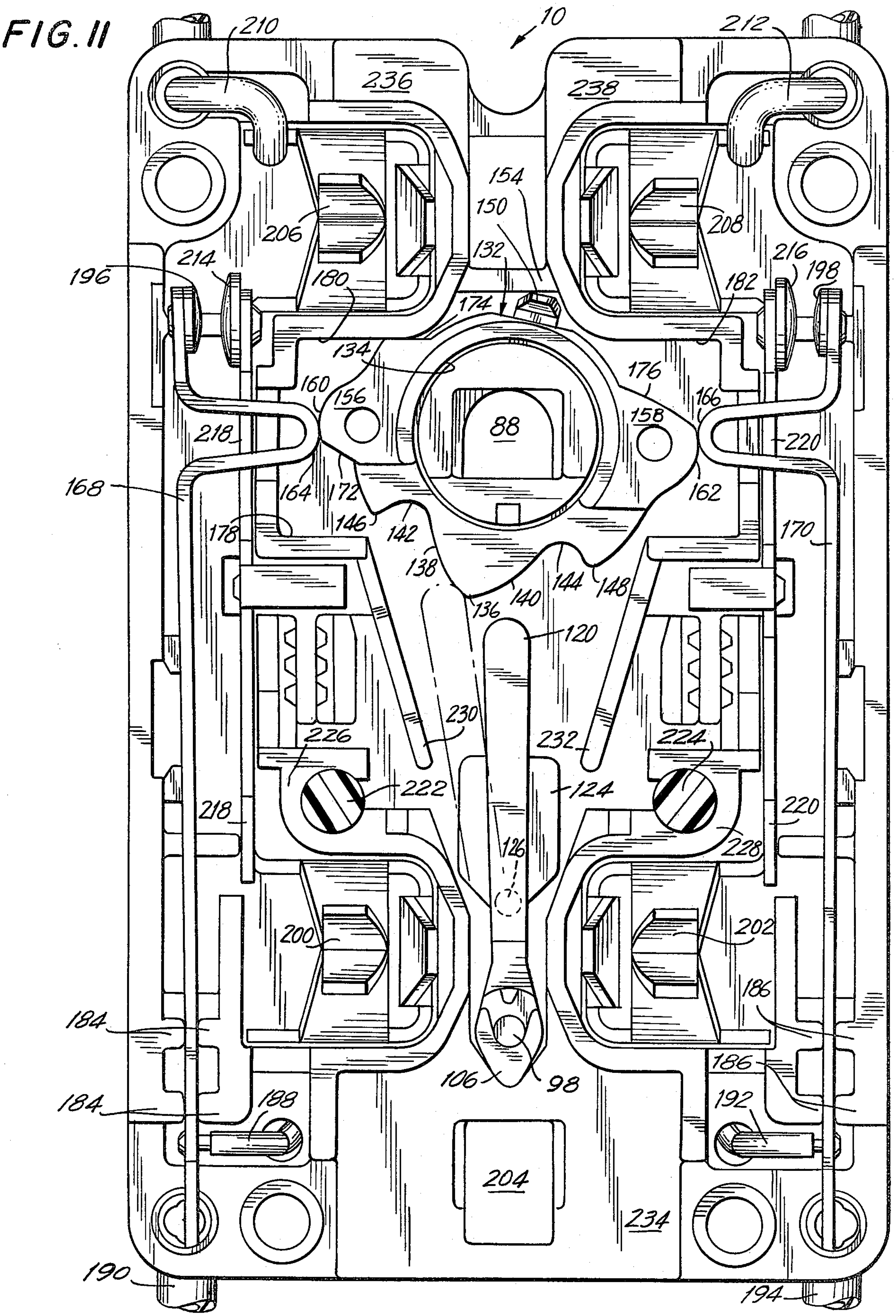
FIG. 11 is a view similar to FIG. 10 showing the next sequential step after coil deenergization.

In moving from the position shown in FIG. 9 to that of FIG. 10, the cam surfaces 160 and 162 of cam 132 have engaged and forcibly urged surfaces 164 and 166, together with their respective contact-carrying members 168 and 170, outwardly away from the axis of rotation of cam 132 (which is coaxial with the longitudinal axis of post 86), with the result that movable contacts 196 and 198 have been moved away from their respective contacted fixed contacts 214 and 216 to the position shown in FIG. 10. This clockwise motion of cam 132 as a result of the actuation of coil 74 has thus resulted in breaking the electrical circuit as between the fixed and movable contacts herein described. It should also be noted that in the rest position shown in FIG. 10, cam 132 and its wings 156 and 158 maintain disconnection of the electrical connection as between the fixed and movable contacts at all times until the next sequential actuation of coil 74.

Before turning to the next actuation of coil 74, it should be emphasized that upon cam 132 assuming the position shown in FIG. 10, the coil 74 is deenergized, with the result that the compressed helical spring 112 urges actuating member 104 and its kicker leg 120 back to the rest position from which it started its travel. It should also be noted that the location of forward end 136 of cam 132 has shifted across the longitudinal center line of system 10 such that it is off center and exposes ramp 140 to the next actuation of kicker leg 120. Thus, upon the next sequential actuation of coil 74, kicker leg 120 comes into contact with ramp 140 in much the same manner as it engaged ramp 138, and thereafter engages pocket 144 and adjoining shoulder 148 such that cam 132 is urged in a counter clockwise direction to the position originally described for FIG. 7. Further counter clockwise movement is prevented by means of interference between surfaces 176 and 182, as well as surfaces 172 and 178.

With this counter clockwise shifting of cam 132, interference between surfaces 160 and 162 with their respective surfaces 164 and 166 is eliminated, such that movable contacts 196 and 198 are able to return under the inward biasing influence of spring members 168 and 170 until these contacts come into engagement and electrical communication with their fixed contacts counterparts, contacts 214 and 216.

The cycles just described may be repeated any number of times as a result of signals generated either remotely or via other means.

The embodiment of the present invention herein described and disclosed is presented merely as an example of the invention. Other embodiments, forms and structures coming within the scope of the present invention will readily suggest themselves to those skilled in the art, and shall be deemed to come within the scope of the appended claims.

What is claimed is:

1. Switching apparatus for selectively completing or interrupting an electrical connection between input and output conductors, or the like, comprising, in combination: a housing; a magnetizable armature disposed within a portion of said housing and being movable between first and second positions; electromagnet coil means disposed within said housing for moving said armature when energized from the first position to the second position; an input contact electrically connected to said input conductor; an output contact electrically connected to said output conductor; strap means for mounting the switching apparatus upon a selected surface, said strap means including portions thereof which define a path of the magnetic field generated by said coil means to influence the position of said armature, and movable cam means responsive to movement of said armature for influencing a separation of said input and output contacts, thereby interrupting electrical connection between them.

2. Apparatus according to claim 1, further including movable actuating means having portions thereof in contact with said armature means for influencing the position of said cam means.

3. Apparatus according to claim 2, wherein said cam means includes portions thereof disposed in the path of said actuating means.

4. Apparatus according to claim 1, wherein said cam means is supported for rotary movement about an axis which substantially coincides with an axis of entry of an electrical connector to be joined with the switching apparatus.

* * * * *